United States Patent [19]
Matsui et al.

[11] Patent Number: 5,583,989
[45] Date of Patent: Dec. 10, 1996

[54] VEHICLE CONTROL SYSTEM HAVING PROGRAM GENERATOR AND CONVERTOR

[75] Inventors: Hiroki Matsui; Masataka Yamamoto; Toshiaki Hirota, all of Wako; Shintaro Oka, Ebina, all of Japan

[73] Assignee: Honda Giken Kogyo Kabushiki Kaisha, Tokyo, Japan

[21] Appl. No.: 278,130

[22] Filed: Jul. 21, 1994

Related U.S. Application Data

[63] Continuation of Ser. No. 889,385, May 28, 1992, abandoned.

[51] Int. Cl.$^6$ .................... G06F 3/05; G06F 9/06
[52] U.S. Cl. .................... 395/500; 364/DIG. 1; 364/DIG. 2; 364/578
[58] Field of Search .................... 395/200, 2.39, 395/100, 2.12, 2.38, 2.14, 2.33, 275, 250, 775, 725, 575, 800, 114, 115, 2.43, 500; 364/580, 425, 582, 552, 727, DIG. 1, DIG. 2, 424.01, 424.03, 424.04, 424.05, 426.01, 431.04, 431.12, 431.11, 578, 426.03; 348/305, 420, 419, 306; 341/51

[56] References Cited

U.S. PATENT DOCUMENTS

| | | | |
|---|---|---|---|
| 4,179,710 | 12/1979 | Ishiguro et al. | 348/419 |
| 4,231,091 | 10/1980 | Motz | 395/425 |
| 4,302,775 | 11/1981 | Widergren et al. | 364/514 |
| 4,574,667 | 6/1986 | Yasuhara | 364/431.04 |
| 4,619,629 | 10/1986 | Shigematsu et al. | 474/28 |
| 4,791,569 | 12/1988 | Suzuki | 364/431.04 |
| 4,797,828 | 1/1989 | Suzuki et al. | 364/431.04 |
| 4,884,206 | 11/1989 | Mate | 364/431.04 |
| 4,933,763 | 6/1990 | Chantelou | 348/420 |
| 4,959,794 | 9/1990 | Shiraishi et al. | 364/424.03 |
| 4,965,878 | 10/1990 | Yamagiwa et al. | 364/424.05 |
| 5,079,631 | 1/1992 | Lhuilliel et al. | 348/405 |
| 5,146,324 | 9/1992 | Miller et al. | 348/405 |

FOREIGN PATENT DOCUMENTS

| | | |
|---|---|---|
| 60-225903 | 11/1985 | Japan . |
| 61-234401 | 10/1986 | Japan . |
| 1-133108 | 5/1989 | Japan . |
| 2-10403 | 1/1990 | Japan . |
| 2-96236 | 4/1990 | Japan . |
| 2-112002 | 4/1990 | Japan . |
| 2-41764 | 9/1990 | Japan . |
| 3-54602 | 3/1991 | Japan . |
| 3-26858 | 4/1991 | Japan . |

OTHER PUBLICATIONS

Dictionary of Computers, Information Processing & Telecommunications, 2nd Ed., John Wiley & Sons, Jerry Rosenberg, N.Y., 1987, pp. 471, 476.

Primary Examiner—Daniel H. Pan
Attorney, Agent, or Firm—Armstrong, Westerman, Hattori, McLeland & Naughton

[57] ABSTRACT

A vehicle control system having program generator and convertor. The system includes a simulation device for simulating actual states such as the actual operating states of an automobile based on various input conditions, a program generation device for generating a control program for an automobile transmission or the like on the basis of the simulated states, a detection device for detecting expressions requiring quantization data included in the control program, a conversion device for converting the detected expressions using a method of notation such as reverse Polish notation, an arithmetic device for multiplying the converted variables by prescribed scaling factors obtained from the quantization factor, and for compressing the expressions multiplied by the arithmetic device. A program generated on a mainframe computer using floating point arithmetic can be translated entirely by machine into a program that can be executed by a microcomputer without using floating point arithmetic.

14 Claims, 9 Drawing Sheets

FIG. 4

| Name of variable | Numerator | Denominator |
|---|---|---|
| A | 98 | 1000 |
| B | | |
| ⋮ | | |

VEHICLE CONTROL SYSTEM HAVING PROGRAM GENERATOR AND CONVERTOR

This application is a continuation of application Ser. No. 07/889,385 filed May 28, 1992, now abandoned.

BACKGROUND OF THE INVENTION

1. Field of the Invention

This invention relates to a program generator, a program convertor and a vehicle control system which uses the generated and converted program, and more particularly to an arrangement enabling a control program whose algorithm has been confirmed through simulation on a large computer to be directly run on a low level computer installed in an automobile.

2. Description of the Prior Art

The on-board electronic control units (Electronic Control Units) widely used for electronically optimizing vehicle internal combustion engine performance are nowadays generally constituted as microcomputers. A control program is loaded in the ECU prior to its installation so as to enable it to provide optimum control under a broad range of engine operating conditions.

In writing the control program, flow charts are first prepared on the basis of specifications worked out by the engineers and then a large number of programmers convert the flow-charted routines into a program to be run on the ECU microcomputer. Since the number of steps involved in writing a program thus becomes very large, the manpower requirements are considerable and the possibility of human error high. Moreover, while the validity of the control algorithm is experimentally tested at the time of determining the specifications, these checks are not able to go into every aspect of the control algorithm behavior and, as a result, a complete evaluation of the appropriateness of the control algorithm is not possible.

In view of this problem, work has been progressing on the establishment of methods for automatically generating control programs while simultaneously determining the optimum parameters by simulation on a mainframe computer.

The problem with this is that the mainframe used for simulation normally conducts numerical computations using floating point arithmetic, while the microcomputer used in the on-board ECU is only an 8- or 16-bit system incapable of conducting floating point operations at high speed. Loading of a control program generated by a mainframe into the on-board computer (ECU) is therefore not practical because of the long time that would be required for its execution. In addition, although the computation cycle does not necessarily have to be short in simulation, the ECU is required to be capable of relatively short control cycles which can, for example, be completed between successive firings in the engine. Because of this, and also owing to the small memory of the ECU and the low resolution of its A/D converter etc., it is impossible to translate a control program generated by a large computer directly into one that can be used in the on-board computer (ECU). The practice has therefore been to print out the control program generated by the mainframe computer and then to rewrite it for use by the on-board microcomputer (ECU), again requiring the work of a large number of programmers. The result is then loaded into the on-board computer via an assembler, linker or the like. The method thus does little to overcome the drawbacks of earlier ones. It still involves a large number of steps and is highly susceptible to human error.

It is therefore one object of the present invention to provide a program generator which overcomes the aforesaid drawbacks of the prior art by enabling a control program to be created on a mainframe while simultaneously checking the algorithm to be machine-translated as it is with negligible use of manpower and then enabling the translated program to be loaded into an on-board vehicle computer through an assembler or linker.

Another object of the invention is to provide a program generator and convertor which enable a control program created on a mainframe while simultaneously checking the algorithm to be machine-translated, as it is, with negligible use of manpower and then enables the translated program to be loaded into an on-board vehicle computer through an assembler or linker.

Another object of the invention is to provide a vehicle control system able to run the program generated by the aforesaid program generator or program generator and convertor.

SUMMARY OF THE INVENTION

This invention achieves these objects by, for example, providing a program convertor comprising storage means for storing a program containing expressions employing variables, detection means for detecting expressions requiring quantization factor from among said expressions, conversion means for converting the expressions detected by the detection means using a prescribed method of notation, and arithmetic means for multiplying the variables of the expressions converted by the conversion means by prescribed values obtained from the quantization factor.

With the program convertor constituted in the foregoing manner it is possible to carry out program conversion with negligible use of manpower, achieve a great reduction in the number of steps required for the conversion and eliminate virtually all human error. Moreover, since during the conversion the variables are appropriately converted using a prescribed method of notation, arithmetic computations can be conducted without using floating point arithmetic. The speed at which the program can be executed is therefore increased.

BRIEF EXPLANATION OF THE DRAWINGS

These and other objects and advantages of the invention will be more apparent from the following description and drawings, in which:

FIG. 4 is a quantization scaling factor table used in the main routine.

DETAILED DESCRIPTION OF PREFERRED EMBODIMENT

Figure 1:
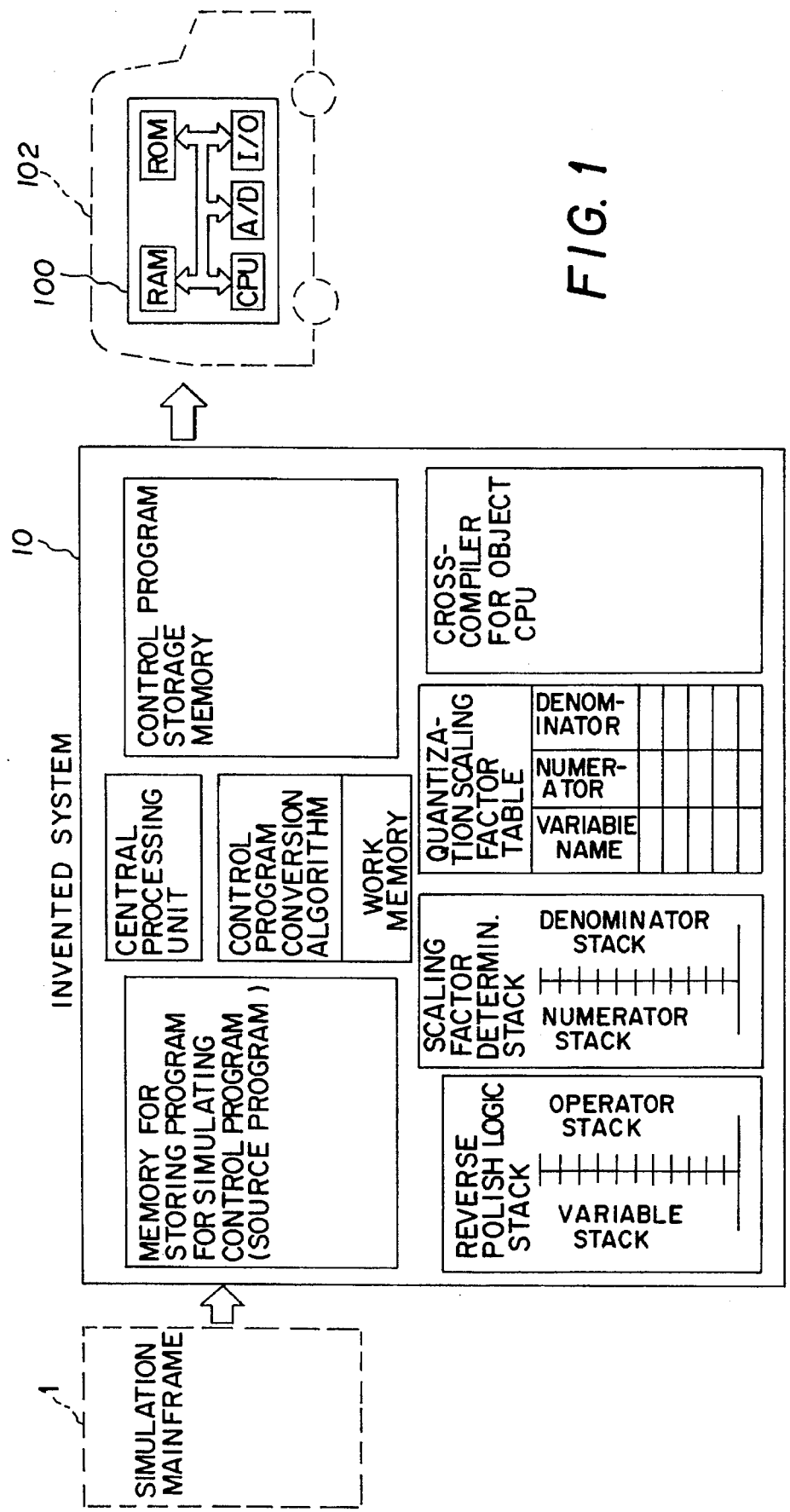
FIG. 1 is a schematic view illustrating the overall arrangement of the system according to the invention.

An embodiment of the invention will now be explained with reference to the drawings.

In the schematic illustration of the overall arrangement of the program generator according to this invention shown in FIG. 1, reference numeral 1 designates a mainframe computer for use in simulation, 10 the program convertor according to the invention (hereinafter called the "post processor") and 100 a computer installed in a vehicle (an ECU). The mainframe 1 generates a control program for vehicle control, e.g. a control program for an automatic transmission, while simultaneously carrying out simulation for checking the behavior of the control algorithm being used. The generated program (source program) carries out operations using floating point arithmetic. Moreover, the memory capacity of the mainframe 1 is large enough to allow a parameter value such as 1 rpm to be expressed as the real number 1.0 rpm.

The post processor 10 has about the same memory capacity as the mainframe 1 and is equipped with a central processing unit.

For simplifying the explanation, the program generator is illustrated functionally in FIG. 1. The source program generated by the mainframe 1 is input to the post processor 10 by use of online data transfer, floppy disks or by some other appropriate means. In the post processor 10, the central processing unit issues instructions for converting the source program into an object program in accordance with a conversion algorithm stored in memory. The converted object program is in a form enabling it to be loaded in a computer (ECU) 100 installed in a vehicle 102. More specifically, the system produces an ECU-specific assembly-language program which is converted in a cross-compiler into microcode. The microcode is then loaded into the on-board ECU via an RS-232C interface, for example, or via ROM or some other such memory medium.

The operation of the program generator will now be explained with reference to the flow chart of FIG. 2, using a vehicle control program as an example.

The source program generated by the mainframe is read in step S10 and information defining the procedure of quantization (hereinafter frequently referred to as the "quantization information") is detected in step S12. Since the main problem encountered in converting a source program to an object program is that of how to handle real numbers, the following explanation of the embodiment will focus mainly on this point.

Figure 3:
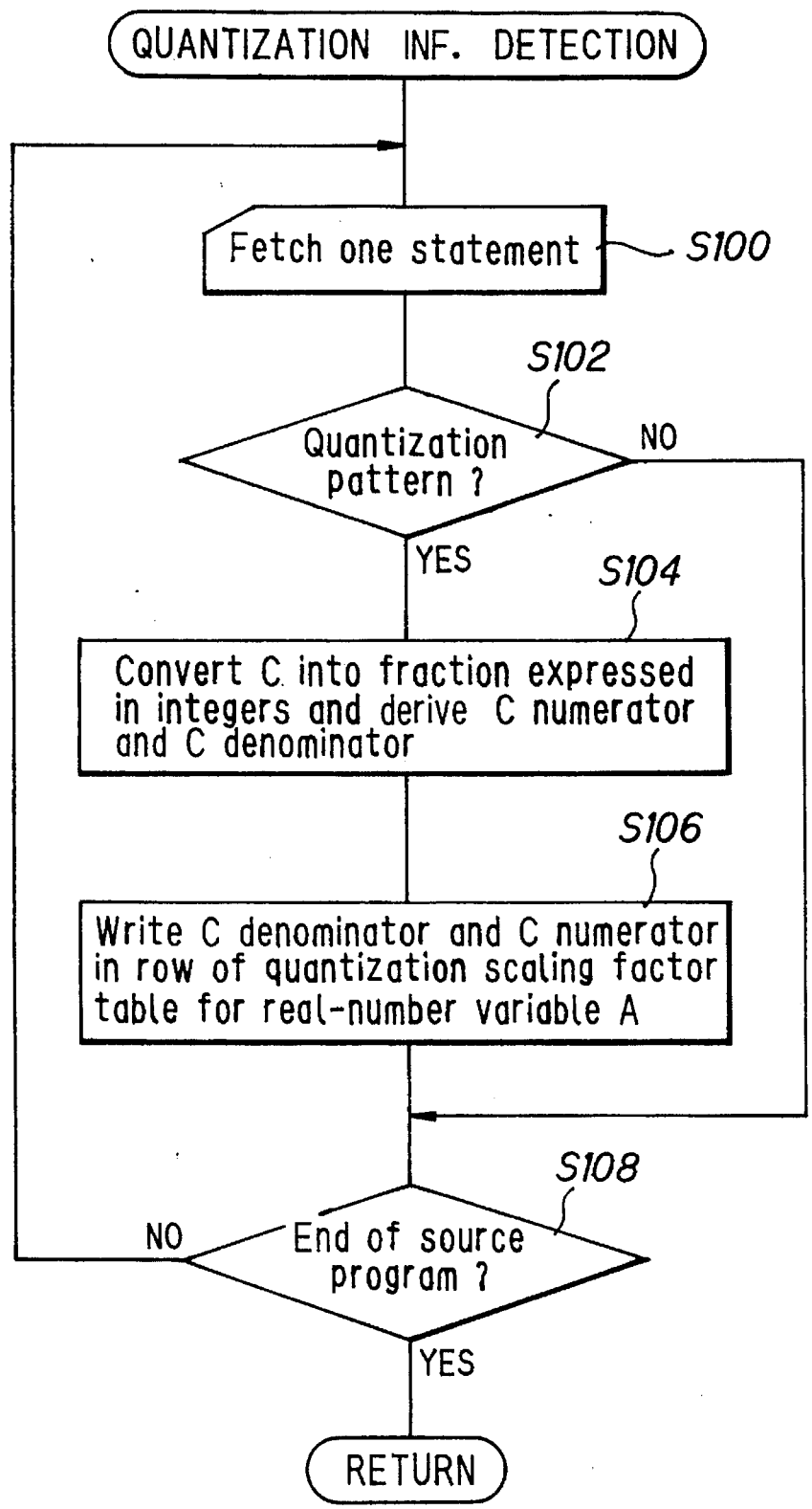
FIG. 3 is the flow chart of a subroutine of the main routine for detecting quantization data.

A subroutine flow chart for conducting the detection of quantization information in step S12 is shown in FIG. 3. (The term "quantization" is used here in its usual meaning of a process whereby the range of values of a variable is divided into a finite number of subranges.) In step S100 of the subroutine, a single statement is read in from the source program. While the range of a statement may differ depending on the language in which the source program is written, this is not taken into consideration in this step. A single statement in the language concerned is simply read in.

A decision is then made in step S102 as to whether or not the statement can be expressed as a quantization pattern. By "quantization pattern" is meant an algebraic equation of the form $$A = C \times r(B/C).$$

where A is a real-number variable, C is a real-number constant, B is a real-number variable and r() is a rounding function. The use of this pattern in carrying out the processing is a key feature of the present invention. The inventors noted that the limited capacity of the ECU side input circuits, specifically the A/D and D/A convertor circuits, is one of the main impediments encountered in an attempt to load a source program generated by a mainframe into an ECU employed in a practical application. They then focused their attention on the aforesaid pattern as providing a way to avoid this impediment. In this pattern, the real-number constant C corresponds to the resolution of the A/D (D/A) conversion circuit of the ECU which is to be installed in the vehicle and the rounding function is for discarding the fractional part of numbers by rounding off to the nearest whole number, for example. The real-number variable B is the variable value input from a sensor through the A/D conversion circuit. In this embodiment it is a vehicle operation control parameter such as the throttle opening or the engine speed. In other words, with regard to control parameter B, the value that can be assigned to a single least significant bit (LSB) in view of the circuit resolution is defined as the real-number constant C, and the real-number variable B is converted into the real-number variable A by scaling it with respect to this minimum unit. The converted control parameter thus maintains the same content but is differently expressed in a form that can be handled by the ECU.

Say, for example, that the quantization pattern is $$BS\ [34] = 0.098 \times (int)\ (BS\ [33] / 0.098)$$

where BS is the array of address at which the control parameter is stored as expressed in a source program written in C and (int) is a rounding function for rounding down. If the parameter is the throttle opening, for instance, this equation means that 1 LSB=0.098 degree in the object ECU and that, accordingly, the throttle opening data stored at address 33 is recalculated into an integer value using the finest resolution (resolution increment) and stored at address [34]. In other words, an equation constituted for dividing the control parameter by the finest resolution allowed by the ECU, converting the result to an integer and scaling the result can be used as an index for converting a program created on a mainframe into one that can be run on an ECU installed in a vehicle. It is also possible to affix search keys to the statements in advance at the source program stage and to use these for making the decision in step S102.

When the result in step S102 is affirmative, control passes to step S104 in which the real-number constant C is converted into a fraction expressed in integers and the C numerator and C denominator are derived. In the example above this would mean converting 0.0098 to 98/1000. As mentioned earlier, the purpose of this is to eliminate the floating point arithmetic and enable calculation using integers.

Next, in step S106, the calculated value is stored in the quantization scaling factor table shown in FIG. 4 (and FIG. 1) opposite the particular variable concerned, namely, opposite the throttle opening, engine speed or other such control parameter concerned. The foregoing procedures are repeated until it is found in step S108 that the end of the source program has been reached.

Figure 2:
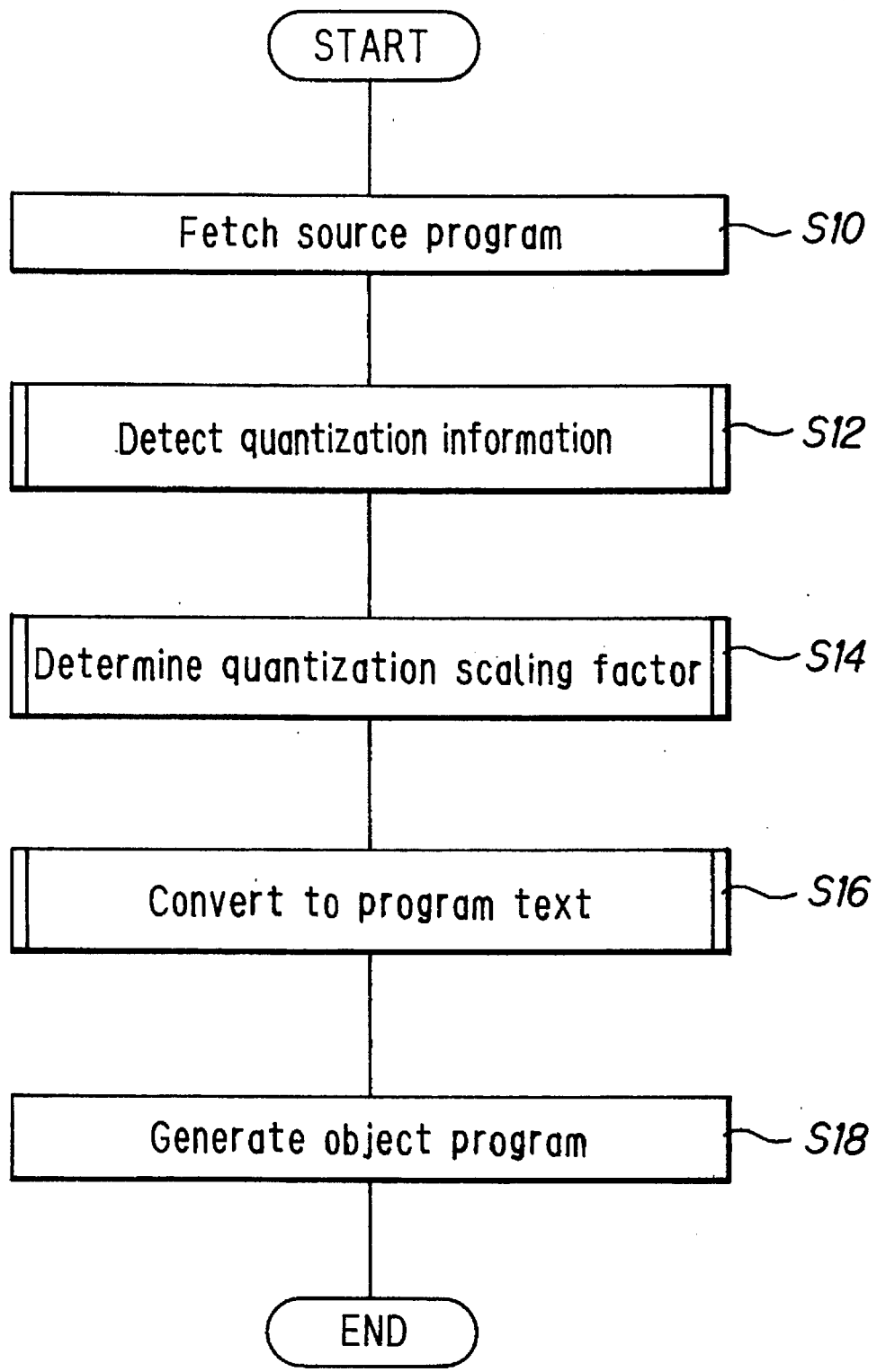
FIG. 2 is a flow chart of the main routine for operating the system.
Figure 5:
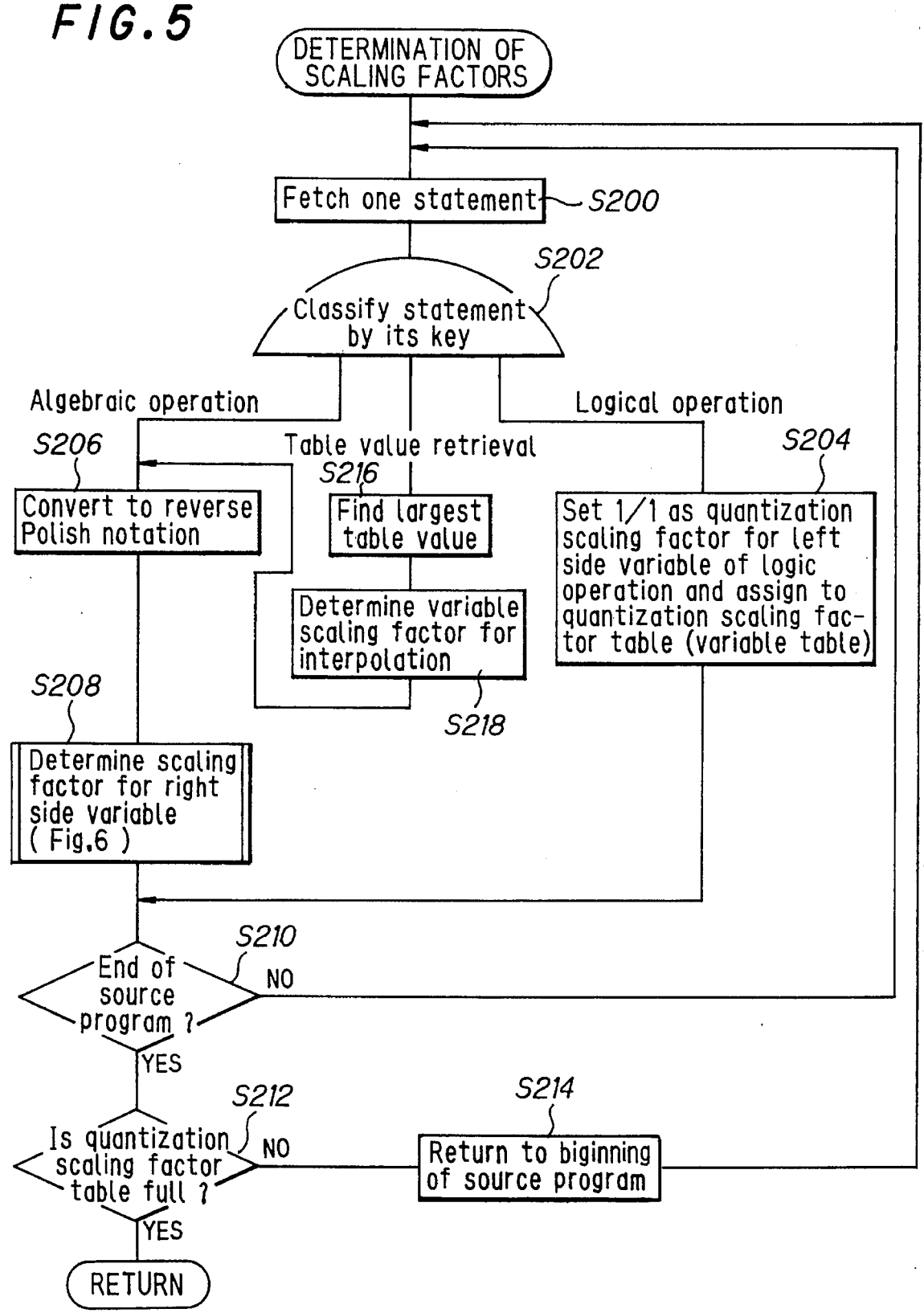
FIG. 5 is the flow chart of a subroutine of the main routine for determining the quantization scaling factor.

When detection of the quantization data has been completed, control passes to step S14 in FIG. 2 for determining the quantization scaling factors. FIG. 5 shows the subroutine for this purpose. The processing here is conducted in addition to that for determining the quantization scaling factors for the input/output parameters in FIG. 3 because calculations are also necessary in connection with various intermediate variables such as the transmission slip ratio calculated from the input and output speeds of the transmission.

The procedure of the flow chart of FIG. 5 starts with the reading in of a single statement in step S200 and control then passes to step S202 where the statement is classified. Each statement is affixed with an appropriate search key indicating its type in advance. When the statement is identified from its search key to be a logic operation, control passes to step S204 where the quantization scaling factor for the left side variable of the logic operation is set to 1/1 and stored in the quantization scaling factor table. This method is adopted for simplifying the procedure since a scaling factor has no meaning in connection with a logic operation whose result is true or false.

When the statement is found to be an algebraic operation in step S202, it requires detailed processing for determining the scaling factor. Control therefore passes to step S206 where operators are appended according to reverse Polish notation. After the order of the operations have been clarified in this way, control passes to step S208 where the scaling factor for the right side variable is determined.

Figure 6:
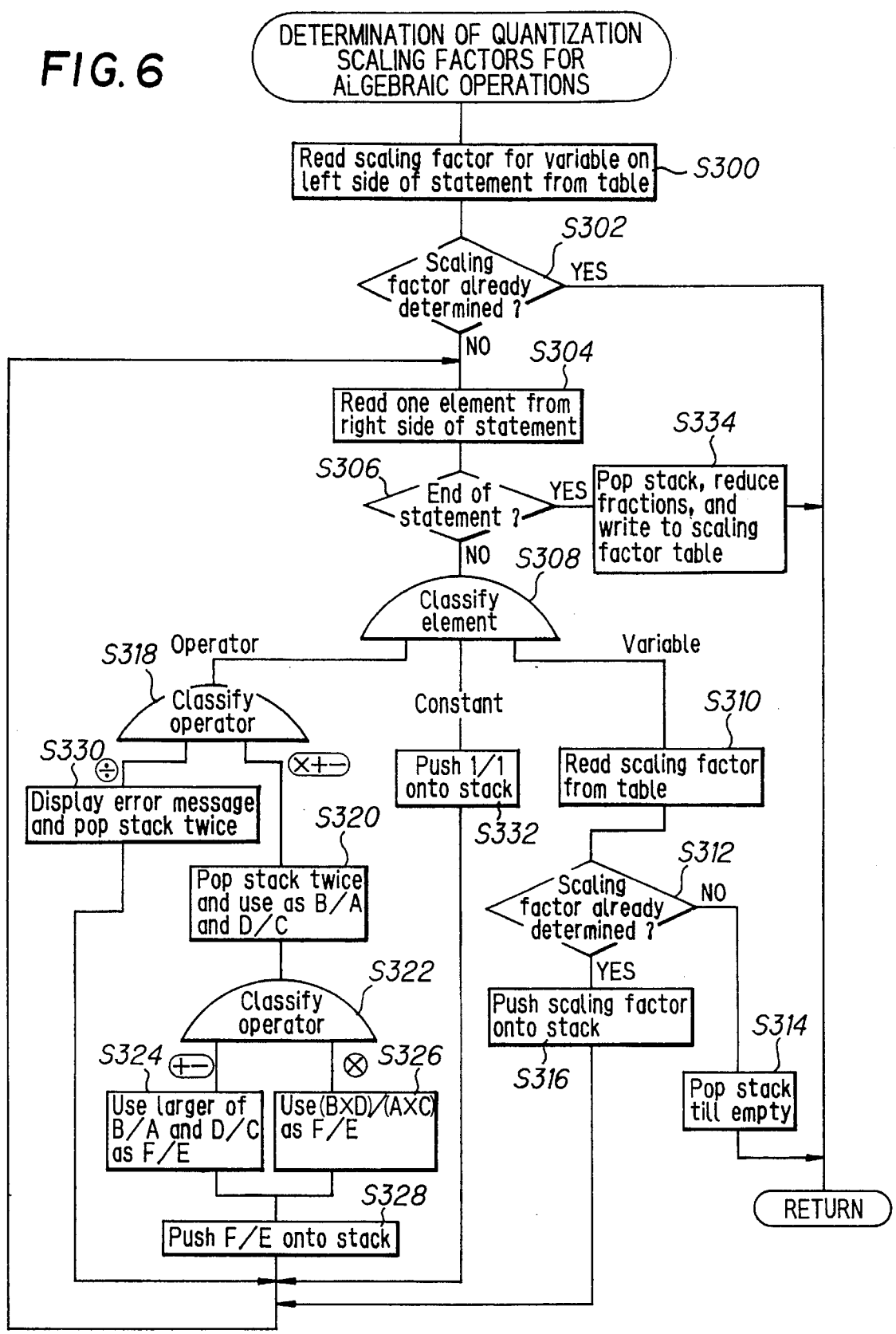
FIG. 6 is the flow chart of a subroutine of the subroutine of FIG. 5 for determining the quantization scaling factor in an algebraic operation.

FIG. 6 is a flow chart of the subroutine for algebraic computation, more precisely for determining the quantization scaling factor for the variable (address) for storage of the computation result.

In step 300 the scaling factor for the left side variable of the statement is read. By way of example, in the case of the algebraic equation BS [47]=BS [46]BS [48]x, the scaling factor for the left side variable [47] is read. Next, in step S302, it is decided whether or not the scaling factor has already been determined. If it has, no further processing is required and the subroutine of FIG. 6 is immediately terminated.

If the scaling factor for the left side is found to be undetermined in step S302, in step S304 a single element, e.g. [46], is read from the right side of the statement. Then after confirming that this is not the end of the statement in step S306, the element concerned is classified in step S308. In the example under discussion, the element is found to be a variable and control passes to step S310 where the scaling factor written at the corresponding address [46] is read. Control then passes to step S312 at which it is decided whether or not the scaling factor has already been determined, and, if not, control passes to step S314 where the stack is popped until empty. This is performed to allocate the work area by clearing the stacked values in a case where, for example, after [46] has been determined, it is found that the value for [48] is indeterminate, making the value for [46] meaningless. When it is found in step S312 that the scaling factor has already been determined, control passes to step S316 in which the scaling factor concerned is pushed onto the stack.

Since a multiplication sign is in the next position in this example, control passes from step S308 to step S318 and, as a result of the operator classification in this step, to step S320 where the stack is popped twice to obtain and output the scaling factors (B/A and D/C) for the two variables positioned ahead of the operator. In step S322 the operator is classified again and if found to be a plus or minus sign, the larger value is chosen as F/E is step S234 in view of the possibility of a digit truncation, whereas if it is a multiplication sign, since this means that the variables are multiplied by each other, the scaling factors are also multiplied in step S326 and the product is used as F/E. The newly calculated value is input to the stack in step S328. If the operator is a division sign, the value for the left side of the source program statement should already have been decided (S302), and if not an error message is displayed and all values in the stack are popped (S330). If the element is found to be a constant in step S308, the value 1/1 is simply input to the stack at S332. When it is found in step S306 that the end of the statement has been reached, control passes to step S334 where all of the stack values are popped, their fractions reduced and the result written into the scaling factor table. This completes the subroutine of FIG. 6.

Returning to FIG. 5, the foregoing operations are repeated until it is found in step S210 that the end of the source program has been reached. When it has, it is determined in step S212 whether or not the quantization scaling factor table is full, and insofar as it is not, the procedure is repeated starting from the beginning of the source program in step S214.

If in step S202 the statement is found to be for retrieving a table value, control passes to step S216 where the address range of the constants of the same quantization scaling factor is determined on the basis of information on the size of the table. Further, for including interpolation in the case of retrieving a value from the table, control passes to step S218 in which the scaling factor for the intermediate variable of the interpolation is obtained from the largest constant in the table. For example, if the scaling factor for the constant xn in the table is 256 and the largest value is 1000, then using the linear interpolation equation $$Y=(1-\alpha)\times 1+\alpha\times 2,$$

the scaling factor of the intermediate variable becomes $$8192=2^{31}/(256\times 1024).$$

Since this equation can be handled as an algebraic operation, control then passes to step. S206 for determination of the quantization scaling factor.

Returning to the flow chart of FIG. 2, control next passes to step S16 where source program text is converted. This refers to the task of rewriting the entire text of the source program based on the scaling factors determined up to this time.

Figure 7:
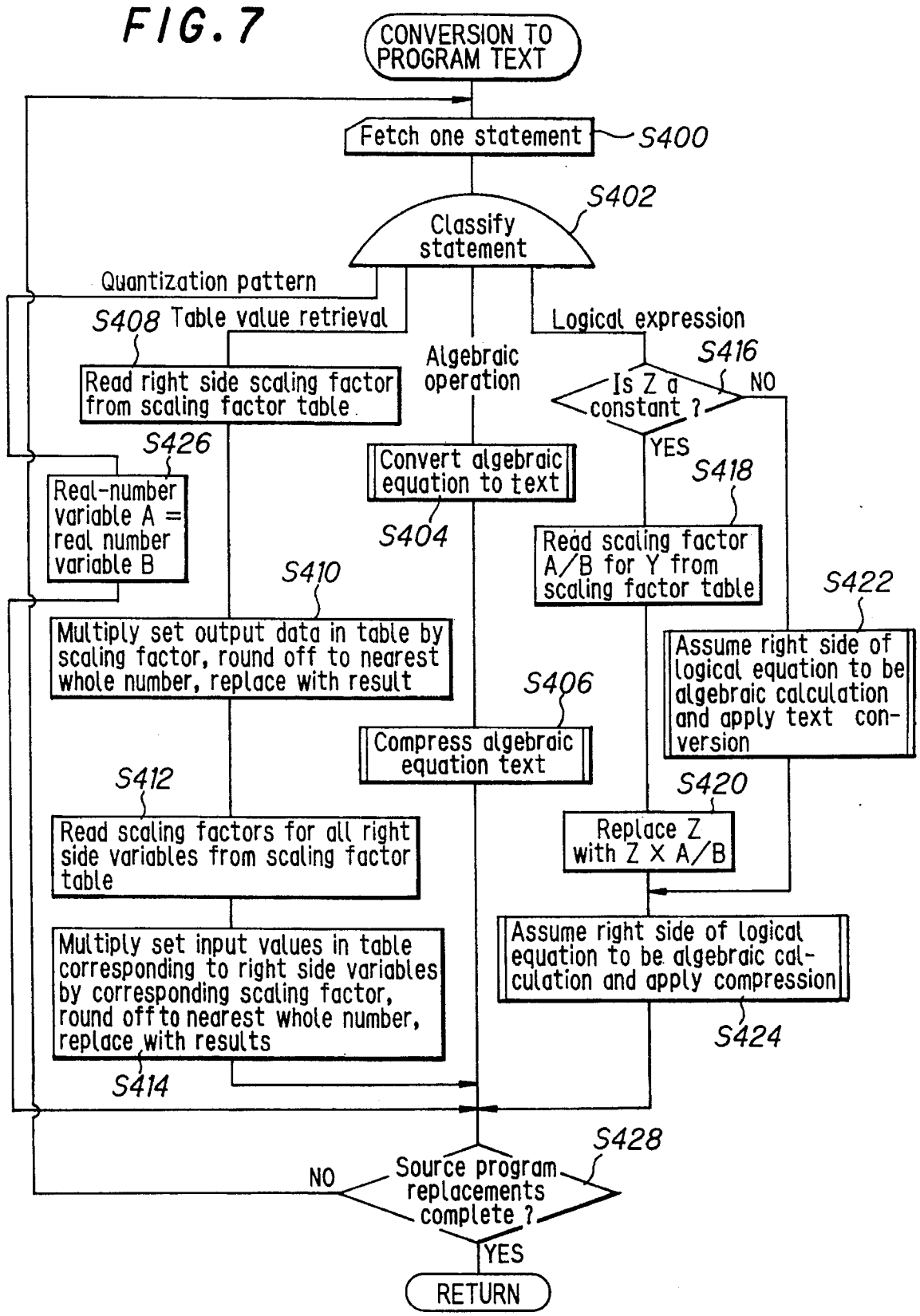
FIG. 7 is the flow chart of a subroutine of the main routine for program text conversion.

FIG. 7 is the flow chart of the subroutine for this task. A single statement is read in step S400 and the statement is classified in step S402. If it is found to be an algebraic operation, control passes to step S404 for algebraic equation text conversion.

Figure 8:
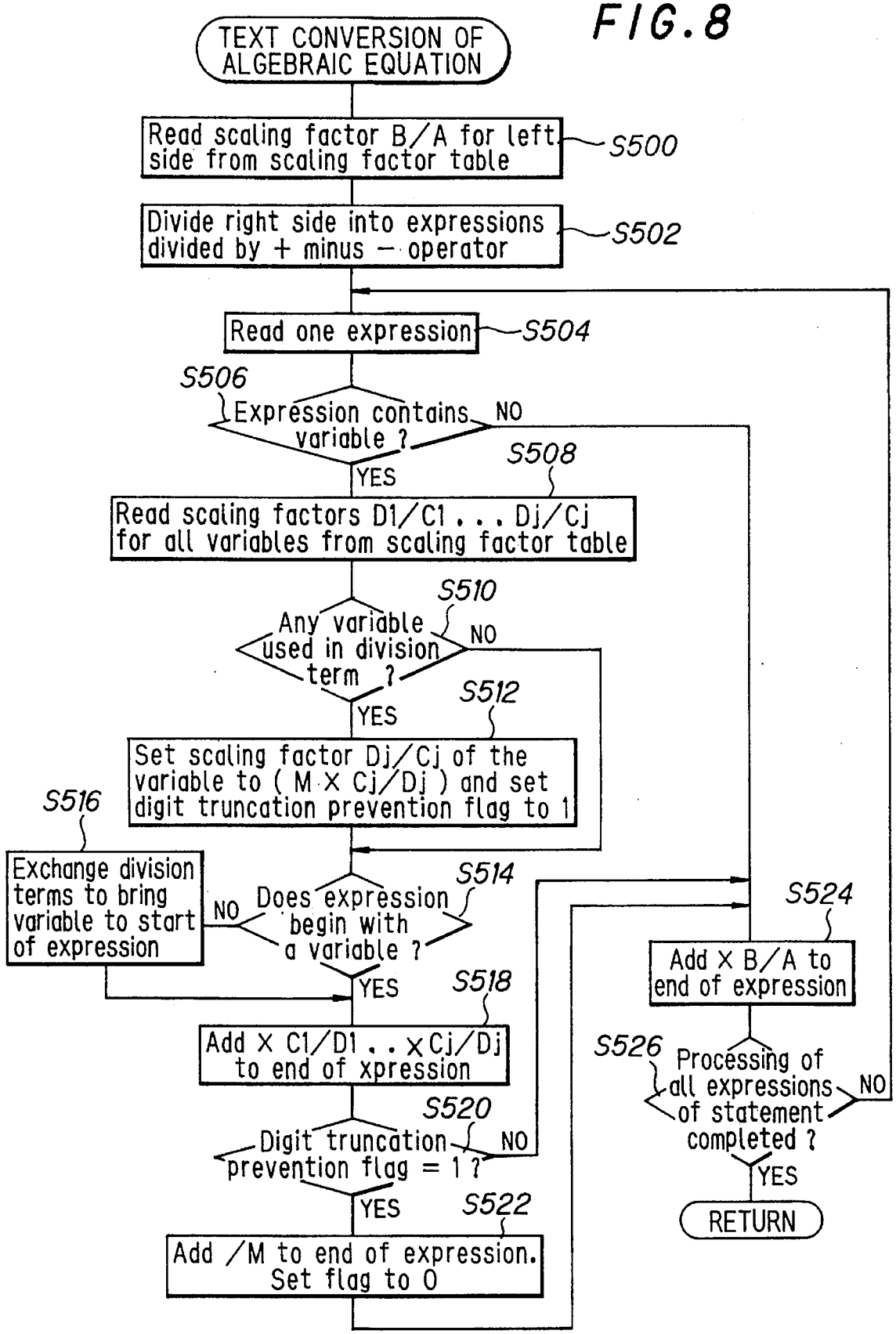
FIG. 8 is the flow chart of a subroutine of the subroutine of FIG. 7 for text conversion of algebraic equations.

FIG. 8 is the flow chart of the subroutine for this conversion. In step S500 the scaling factor for the left side variable (B/A) is read from the scaling factor table, in step S502 the right side is divided into expressions separated by plus or minus sign, and in step S504 one of the expressions is read in.

Next, in step 506, it is decided whether or not the expression includes one or more variables and if it does, control passes to step S508 in which the scaling factors (D1/C1 ... Dj/Cj) of all the variables contained therein are read from the scaling factor table. In the following step S510 it is decided whether or not there are any variables used in division terms and if there are, in step S512 the scaling factor (Dj/Cj) of the variable is set to (M×Cj/Dj) and a digit truncation prevention flag is set to 1. In other words, since division is involved, the scaling factor is set to its reciprocal and multiplication by 8, 32 . . . or other appropriate number is carried out to prevent digit truncation.

Step S514 decides whether or not the expression begins with a variable and if it does not, i.e. if the expression begins with a constant, control passes to step S516 in which a variable is positioned at the beginning of the expression. This is done to avoid the risk of digit truncation by calculating the variable first, which is possible because the variables have already been expressed in integers. While the handling of constants was not discussed in the foregoing, any constant including a fractional value is re-expressed using integers between steps S504 and S506, for instance. For example, the constant 716.2 is re-expressed as $7162/10$.

Next, in step S518, $\times C1/D1 \ldots \times Cj/Dj$ is added to the end of the expression. In view of the fact that the determined scaling factors are used for all variables, as explained in connection with step S508, it will be understood that this is done to carry out scaling by scaling by the reciprocals of the scaling factors. In step S520 it is decided whether or not the digit truncation prevention flag bit is set to 1, and if it is, control passes to step S522 in which scaling is carried out by multiplication by the reciprocal of the aforesaid value M and the flag bit is reset to 0. Next, in step S524, a value equal to the scaling factor of the left side is added to the end of the expression, thus scaling by multiplication it in the same way. The foregoing operations are repeated until it is found in step S526 that processing of all expressions of the statement has been completed.

Figure 9:
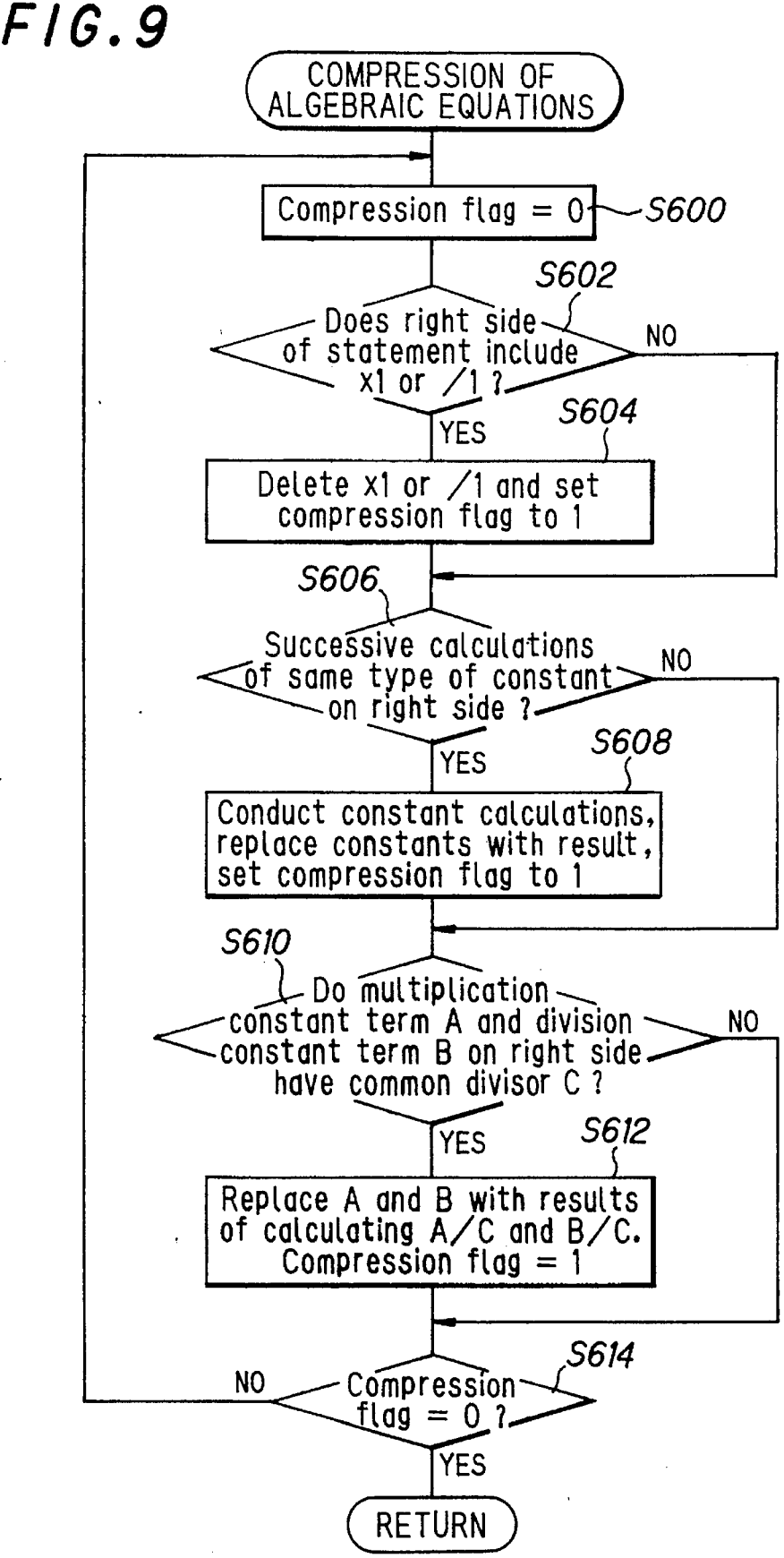
FIG. 9 is the flow chart of a subroutine of the subroutine of FIG. 7 for compressing algebraic equations.

Returning to the flow chart of FIG. 7, control passes to step S406 in which the algebraic text is compressed. This a reduction operation carried out according to the flow chart of FIG. 9. The procedure starts with step S600 where a compression flag is set to zero, whereafter control passes to step S602 which decides whether or not the right side of the statement includes the meaningless term x1 or /1. If it does, control passes to step 604 in which the term is deleted and the compression flag set to 1.

Next, step S606 decides whether or not the deletion of a meaningless term resulted in successive calculations of the same type of constant on the right side, and if it did, control passes to step S608 in which the calculations are conducted, the constants replaced with the result and the compression flag set to 1 (if not already 1). Next, step S610 decides whether reduction of a fraction is possible, and if it is, the fraction is reduced in step S612 and the compression flag is set to zero in step S614. The foregoing operations are repeated until reduction of the expression has been completed.

In the flow chart of FIG. 7, if it is found in step S402 that the statement is for retrieving a table value, control passes to step S408 in which the left side scaling factor is read from the scaling factor table. This is for carrying out the same type of scaling as referred to earlier. So are steps S412–S414.

If it is found in step S402 that the statement is a logical equation, control passes to step S416. The logical equation here can be expected to be of the type $X = Y$ (logical operator) $Z$.

Step S416 decides whether or not Z is a constant. If affirmative, step S418 reads the scaling factor (B/A) for Y and control passes to step S420 where Z is multiplied by the reciprocal of the scaling factor. This is also for scaling. For example, when Z and Y are compared, if the scaling factor for Y is 1/5, that for Z also has to be made 1/5.

If it is found in step S416 that Z is not a constant, since it can be assumed that it includes a variable, control passes to step S422 where operations similar to those explained earlier for algebraic text conversion are conducted. Control then passes to step S424 in which compression (reduction) is carried out. If it is found in step S402 that the statement is of the quantization pattern explained in connection with FIG. 3, since no further processing is necessary, control passes to step S426 in which the variable is simply replaced.

The foregoing operations are repeated until it is found in step S428 that replacement has been completed for the entire source program.

Returning to FIG. 2, as a result of the foregoing processing operations there is obtained an object program of the same content as the source program but which uses whole numbers, more specifically in which the numerical values are multiplied by fractions (S18). Therefore, when the program generated in accordance with FIG. 1 is loaded into an on-board ECU via an appropriate assembler, the ECU will for all intents and purposes store the automatic transmission control program or other such program simulated on the mainframe computer. In the case of transmission control, for example, the ECU will be able to determine the gearshift schedule from the operating conditions based on the control algorithm and carry out gearshift operations by actuating solenoids (not shown) or the like. As the gist of the invention does not reside in the method of conducting this control, however, it will not be explained further here.

As the translation of a source program into an object program in the manner of this embodiment can be achieved through conversion without need for input from the outside, the number of steps involved can be dramatically reduced and the possibility of human error substantially eliminated. Moreover, since the behavior of the control program itself is checked by simulation, the ECU storing the translated program operates in accordance with the prescribed control algorithm.

While reverse Polish notation is used in the embodiment just described, Polish notation can be used instead. In addition, when a language with a tree structure is used, its syntax tree can be used.

What is claimed is:

1. A vehicle control system using an object program for a vehicle automatic transmission based on operating conditions of a vehicle, comprising:

a microcomputer mounted in the vehicle;

source program generating means for generating a source program, while determining parameters to be used in the source and a control algorithm through simulation on a mainframe computer;

storage means, operably connected to said source program generating means, for storing the source program containing expressions employing the variable;

detection means, operably connected to said storage means, for detecting expressions containing at least a quantization factor with floating-point arithmetic from among said expressions;

conversion means, operably connected to said detection means, for converting the expressions detected by said detecting means into a microcode, which is loaded into the microcomputer of the vehicle, containing at least a quantization factor without floating-point arithmetic using a prescribed method of notation;

arithmetic means, operably connected to said conversion means, for multiplying the variables of the microcode containing at least a quantization factor without floating-point arithmetic converted by the conversion means by prescribed values obtained from the expressions containing at least a quantization factor with floating-point arithmetic to convert into the object program including the microcode multiplied by the prescribed value; and loading means for loading the object program on the microcomputer, wherein said microcomputer determines a gear shift scheduling by using the object program in response to the operating conditions of the vehicle.

2. The vehicle control system according to claim 1, wherein the prescribed values obtained from the quantization factor are fractions.

3. The vehicle control system according to claim 1, wherein the variables multiplied by the prescribed values include an information indicating priority.

4. The vehicle control system according to claim 1, wherein the prescribed method of notation is a Polish notation or a reverse Polish notation.

5. A vehicle control system using an object program for a vehicle automatic transmission based on operating conditions of a vehicle, comprising:

a microcomputer mounted in the vehicle;

source program generating means for generating a source program, while determining control parameters and a control algorithm through simulation on a mainframe computer;

detection means, operably connected to said source program generating means, for detecting expressions containing at least a quantization factor with floating-point arithmetic included in the source program;

conversion means, operably connected to said detection means, for converting the expressions detected by the detection means into a microcode, which is loaded into a microcomputer of the vehicle, containing at least a quantization factor without floating-point arithmetic using a prescribed method of notation;

arithmetic means, operably connected to said conversion means, for multiplying the variables of the microcode containing at least a quantization factor without floating-point arithmetic converted by the conversion means by prescribed values obtained from the expressions containing at least a quantization factor with floating-point arithmetic to convert into the object program including the microcode;

state transformation means, operably connected to said arithmetic means, for reducing the microcode containing at least a quantization factor without floating-point arithmetic containing variables multiplied by the arithmetic means; and loading means for loading the object program including the reduced microcode on the microcomputer, wherein said microcomputer determines a gear shift scheduling by using the object program in response to the operating conditions of the vehicle.

6. The vehicle control system according to claim 5, wherein the prescribed values obtained from the quantization factor are fractions.

7. The vehicle control system according to claim 5, wherein the variables multiplied by the prescribed values include an information indicating priority.

8. The vehicle control system according to claim 5, wherein the prescribed method of notation is a Polish notation or a reverse Polish notation.

9. The vehicle control system according to claim 5, further comprising memory means for storing said generated source program and control means for controlling a system using said memory means.

10. A vehicle control system having a program converter, said program convertor comprising:

a. storage means for storing a program containing expressions at least employing a real number variable;

b. detection means for detecting expressions, at least the real number variable requiring quantization, from among said expressions;

c. conversion means for converting the expressions detected by the detection means using a prescribed method of notation;

d. arithmetic means for rewriting the real number variable of the expressions converted by the conversion means to a fraction made of an integer denominator and an integer numerator such that calculation is conducted by the integer values; and e. loading means for loading the program containing the expressions on a microcomputer mounted in a vehicle, wherein the prescribed method of notation is a Polish notation or a reverse Polish notation.

11. A vehicle control system having a program generator and convertor, said program generator and converter comprising:

a. simulation means for simulating actual states based on various input conditions;

b. generating means for generating a control program on the basis of the states simulated by the simulation means;

c. detection means for detecting expressions including a real number variable requiring quantization included in the control program;

d. conversion means for converting the expressions detected by the detection means using a prescribed method of notation;

e. arithmetic means for rewriting the real number variables of the expressions converted by the conversion means to a fraction made of an integer denomination and an integer numerator such that the calculation is conducted by the integer values;

f. state transformation means for reducing the expression rewritten by the arithmetic means; and g. loading means for loading the program containing the expressions on a microcomputer mounted on a vehicle, wherein the prescribed method of notation is a Polish notation or a reverse Polish notation.

12. A vehicle control system having a program generator and convertor, said program generator and converter comprising:

a. simulation means for simulating actual states based on various input conditions;

b. generating means for generating a control program on the basis of the states simulated by the simulation means;

c. detection means for detecting expressions including a real number variable requiring quantization included in the control program;

d. conversion means for converting the expressions detected by the detection means using a prescribed method of notation;

e. arithmetic means for rewriting the real number variables of the expressions converted by the conversion means to a fraction made of an integer denomination and an integer numerator such that the calculation is calculated by the integer values;

f. state transformation means for reducing the expression rewritten by the arithmetic means; and g. loading means for loading the program containing the expressions on a microcomputer mounted on a vehicle, wherein said microcomputer determines a gear shift scheduling by using the program in response to operating conditions of the vehicle.

13. A vehicle control system having a program generator and convertor, said program generator and converter comprising:

a. simulation means for simulating actual states based on various input conditions;

b. generating means for generating a control program on the basis of the states simulated by the simulation means;

c. detection means for detecting expressions including a real number variable requiring quantization included in the control program;

d. conversion means for converting the expressions detected by the detection means using a prescribed method of notation;

e. arithmetic means for rewriting the real number variables of the expressions converted by the conversion means to a fraction made of an integer denomination and an integer numerator such that the calculation is conducted by the integer values;

f. state transformation means for reducing the expression rewritten by the arithmetic means;

g. loading means for loading the program containing the expressions on a microcomputer mounted on a vehicle; and h. memory means for storing said generated source program and control means for controlling a system using said memory means.

14. A vehicle control system having a program generator, said program convertor comprising:

a. storage means for storing a program containing expressions at least employing a real number variable;

b. detecting means for detecting expressions, at least the real number variable requiring quantization, from among said expressions;

c. conversion means for converting the expressions detected by the detection means using a prescribed method of notation;

d. arithmetic means for rewriting the real number variable of the expressions converted by the conversion means to a fraction made of an integer denominator and an integer numerator such that calculation is conducted by the integer values;

e. loading means for loading the program containing the expressions on a microcomputer mounted in a vehicle; and f. control means for controlling a system using said storage means.

* * * * *

UNITED STATES PATENT AND TRADEMARK OFFICE
CERTIFICATE OF CORRECTION

PATENT NO.: 5,583,989
DATED: December 10, 1996
INVENTOR(S): Hiroki MATSUI et al.

It is certified that error appears in the above-identified patent and that said Letters Patent is hereby corrected as shown below:

On the cover page, Item [73], please correct the assignee to indicate both assignees by adding the second Assignee as follows: Denshi Giken Co., Ltd. of Sendai-shi, Japan Signed and Sealed this Twenty-fourth Day of June, 1997

Attest:

BRUCE LEHMAN

Attesting Officer     Commissioner of Patents and Trademarks